Jan. 3, 1956  J. E. DUGGAN  2,729,476
SHAFT OR JOURNAL SEAL
Filed March 24, 1952  2 Sheets-Sheet 1

INVENTOR.
JAMES E. DUGGAN
BY Whittemore,
Hulbert & Belknap
ATTORNEYS

Jan. 3, 1956   J. E. DUGGAN   2,729,476
SHAFT OR JOURNAL SEAL
Filed March 24, 1952   2 Sheets-Sheet 2
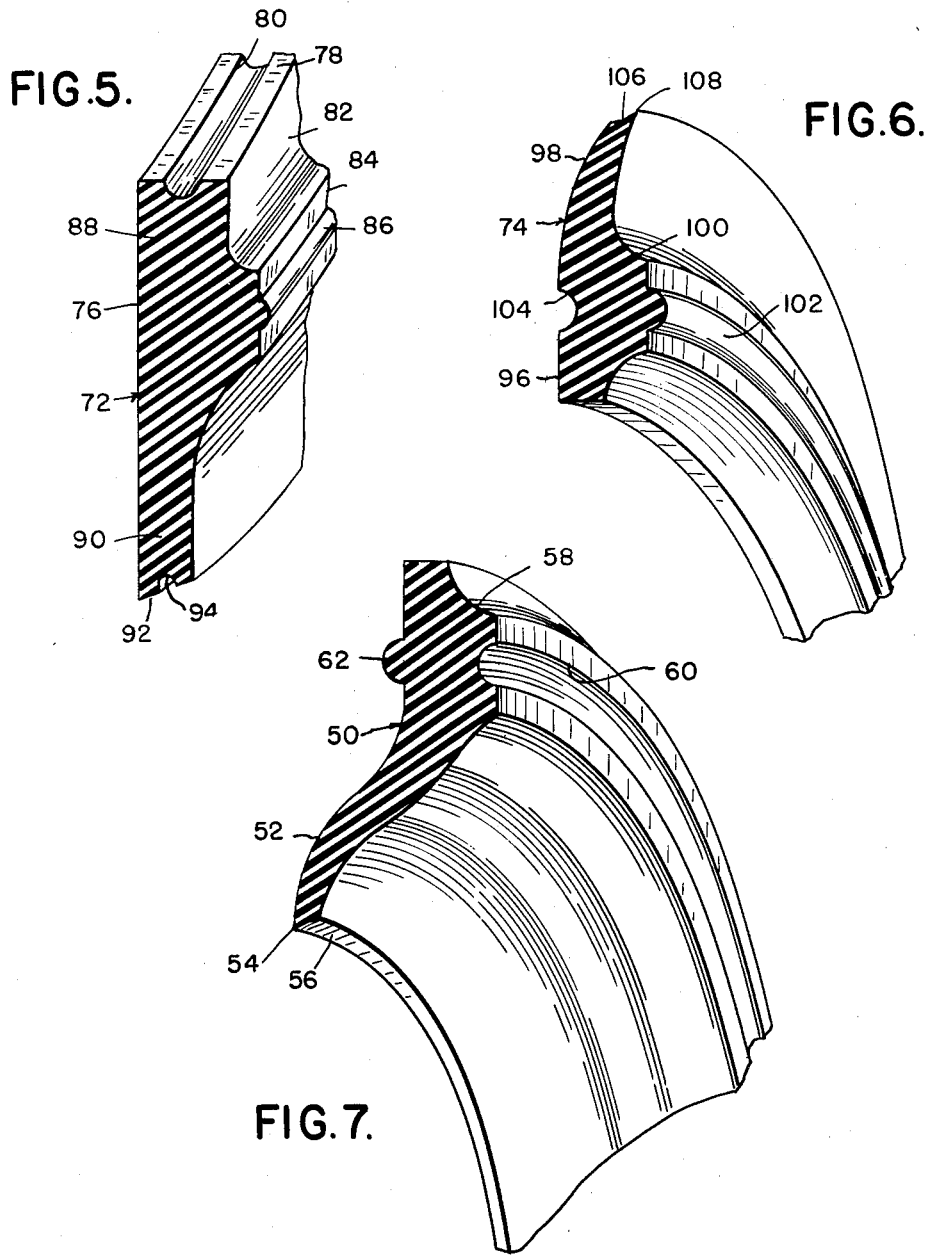
*INVENTOR.*
JAMES E. DUGGAN
BY Whittemore
Hulbert & Belknap
ATTORNEYS United States Patent Office 2,729,476
Patented Jan. 3, 1956

2,729,476

SHAFT OR JOURNAL SEAL

James E. Duggan, Jamestown, R. I., assignor to Watts Electric & Mfg. Co., Birmingham, Mich., a corporation of Michigan Application March 24, 1952, Serial No. 278,272

5 Claims. (Cl. 286—11.11)

The present invention relates to a shaft or journal seal.

It is an object of the present invention to provide a shaft or journal seal comprising a plurality of rings formed of a flexible plastic material adapted to be inserted in an annular space between shaft and journal parts.

It is a further object of the present invention to provide a seal of the character described comprising a plurality of rings having inner and outer edge portions, one of the portions being relatively thicker than the other, the relatively thick portion being provided with interfitting means whereby said rings are inter-engaged and pressed together axially, said relatively thinner edge portions including sealing lips at the edges thereof.

It is a further object of the present invention to provide a sealing ring as described above in which the relatively thinner edge portion is inclined from the plane of the ring.

It is a further object of the present invention to provide a sealing ring in which the edge of the relatively thinner edge portion is concave and provides a sealing lip.

It is a further object of the present invention to provide a sealing ring of the character described in which the relatively thinner edge portions are inclined from the plane of the ring and are concave at the edges thereof to provide sealing lips.

Other objects and features of the invention will become apparent as the description proceeds, especially when taken in conjunction with the accompanying drawings, wherein:

Figure 5 is a transverse section through one of the outer rings employed in the assembly shown in Figure 4.

Figure 6 is a transverse fragmentary section through one of the intermediate rings employed in the assembly of Figure 4.

Figure 7 is a fragmentary section of an intermediate sealing ring similar to that shown in Figure 3 with its flexible sealing portion reversed to prevent leakage of oil out of the journal.

Figure 1:
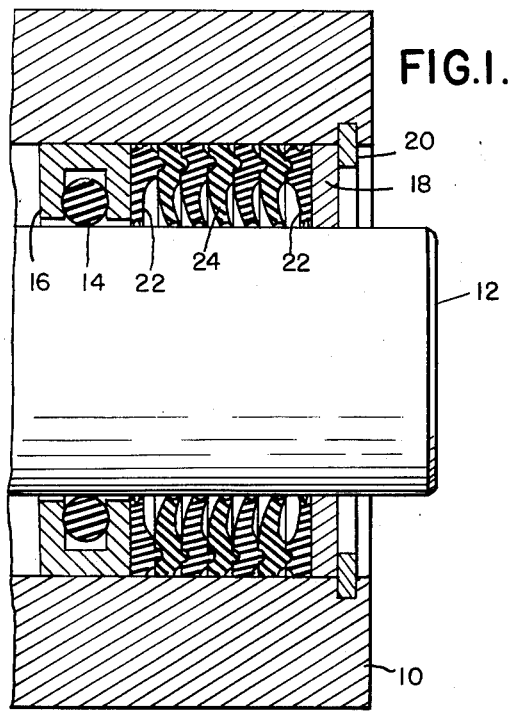
Figure 1 is a sectional view showing the assembly of shaft and journal parts employing the present sealing means.

Referring now to Figure 1 there is shown a journal part 10 and a shaft part 12, the shaft being mounted for rotation in the journal by suitable bearings indicated generally at 14. Intermediate the shaft and journal parts in an annular space closed at its inner end by bearing structure 16 and closed at its outer end by an annular member 18 held in place by a split ring 20.

Figure 2:
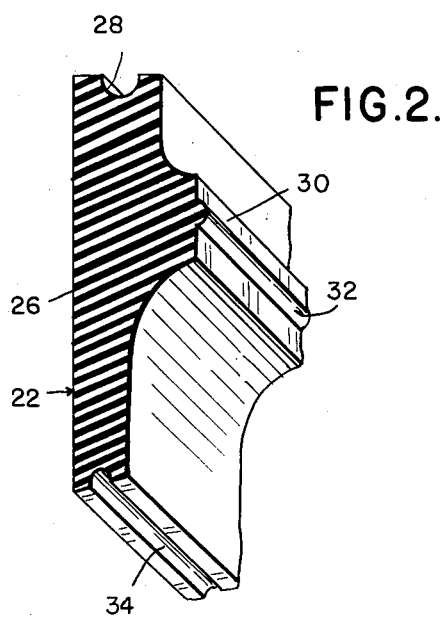
Figure 2 is an enlarged fragmentary section through one of the end rings employed in the seal.
Figure 3:
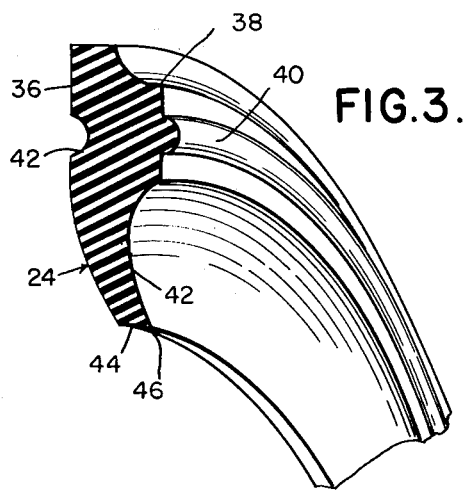
Figure 3 is an enlarged transverse fragmentary section through one of the intermediate rings employed in the seal.

In order to provide a seal to prevent entry of foreign matter into the journal, sealing means comprising outer rings 22 and a plurality of inner or intermediate rings 24 is provided. As best seen in Figure 2, the outer ring comprises a flat surface 26 shaped to engage against the bearing portion 16. The outer edge of the ring 22 is provided with an inwardly extending annular groove 28 which engages the inner surface of the journal 10. The opposite side of the ring 22 is provided with a thickened outstanding rib 30 which in turn is provided with a tongue 32 herein illustrated as substantially semi-circular in cross-section. The inner portion of the ring 22 is relatively thin and its inner edge includes the annular groove 34. The opposite outside ring is similar except that its rib is at the opposite side thereof and provided with a groove shaped to receive an annular tongue. The arrangement and construction of the intermediate rings is most apparent from Figure 3. As seen in this figure the intermediate rings 24 comprise an outer relatively thick portion 36 provided at one side thereof with a laterally extending rib 38 which in turn is provided with a tongue 40. The opposite side of the ring 24 is provided with an annular groove 42 concentric with the tongue 40 and shaped to receive the tongue of an adjacent ring. Inwardly of the rib 38 the ring 24 is relatively thin as indicated at 42, and in addition, is inclined from the plane of the ring. As a result of its inclination the inner portion of the ring therefore assumes a somewhat conical shape. The relatively thin flexible portion 42 terminates in an inner edge surface 44 which is slightly concave and the intersection between the curved inner edge 44 and the adjacent side of the ring provides a sharp sealing lip indicated at 46.

Referring again to the assembly shown in Figure 1, it will be observed that any tendency for foreign material to flow inwardly of the shaft into the journal box is opposed by the sealing lips 46 engaging the shaft 12.

In the event that the problem is to prevent leakage of oil out of the journal rather than to prevent the entry of foreign material thereinto, a basically similar construction is provided which differs primarily in that the intermediate sealing rings take the form shown at 50 in Figure 7. It will be observed that the sealing rings 50 differ from the sealing rings 24 primarily in that the relatively thin flexible inner portion 52 thereof extends in a reverse direction so that the sealing lips 54 provided by the intersection of the concave inner edge 56 and the adjacent side of the ring are disposed to be pressed firmly into sealing engagement with the shaft by any differential pressure tending to cause flow of oil outwardly of the journal box.

The ring 50 includes the thick rib 58 which in this instance is shown as provided with an annular groove 60 shaped to cooperate with tongues 62 which are provided on the intermediate rings.

Figure 4:
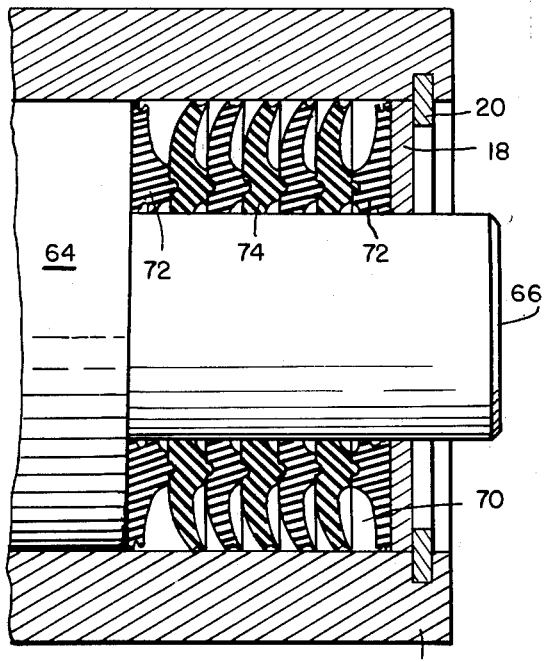
Figure 4 is an axial section through a shaft and journal assembly showing a different arrangement of sealing means.

Referring now to Figure 4 the shaft 64 is shown as provided with a reduced portion 66 spaced inwardly from the journal 68 to provide the annular space 70 therein. In this case the sealing rings comprise outer rings 72 and inner rings 74 and are designed and intended to rotate with the shaft and accordingly take the form illustrated in detail in Figures 5 and 6.

In Figure 5 there is illustrated one of the outer or end rings 72 which comprises a flat side surface 76, an inner shaft engaging edge surface 78 provided with an annular groove 80, an opposite side surface 82 provided with an outstanding annular rib 84 having an annular tongue 86 extending outwardly therefrom. The inner portion of the ring as indicated generally at 88 is relatively thick and the outer portion thereof, as indicated generally at 90, is relatively thin. The outer surface of the ring is inclined as indicated at 92 and is provided with an annular groove 94 therein. The opposite end ring 72 is identical with that disclosed except that its rib 84 is at the opposite side thereof and has a groove therein.

The intermediate rings, as seen in Figure 6, comprise relatively thick inner edge portions 96 and relatively thin flexible outer edge portions 98. The edge portions 98 are inclined or curved away from the plane of the ring. The relatively thick inner edge portion of the ring 74 includes a laterally outstanding rib 100 provided with an annular tongue 102. At the opposite side of the ring 74 there is provided an annular groove 104 concentric with the tongue 102 and shaped to receive the tongue of an adjacent ring in an assembly. The outer edge of the ring is concave as indicated at 106 and intersects the side of the ring toward which the outer edge portion is inclined in a sharp sealing lip 108.

The operation of the sealing structure illustrated in Figure 4 is similar to that illustrated in Figure 1 except that due to the rotation of the sealing rings with the shaft, the flexible outer portions thereof tend to straighten out due to centrifugal force and as a result press more firmly against the inner surface of the journal. Accordingly the pressure exerted by the sealing rings and particularly the sealing lips 108 thereof against the inner surface of the journal is in part dependent upon the speed of rotation of the shaft. The particular arrangement illustrated in Figure 4 is designed to operate most efficiently to prevent the entry of foreign material into the journal. However, it will be apparent that by reversing the direction of inclination of the flexible outer portions 98 of the ring 74, the rings could act most efficiently to prevent leakage of oil out of the journal.

In general the arrangement is one in which a relatively light sealing contact is maintained between the shaft or journal by a flexible element which is adapted to yield under pressure so as to establish a stronger seal. The direction of the seal is optional and depends upon the design of the equipment for which the seal is furnished. In either case the sealing rings are designed to bear lightly against the part with respect to which they have rotation but to have the sealing pressure therewith increased upon the application of pressure tending to cause a flow past the sealing ring. Thus the rings act automatically to build up sealing forces in response to the application of pressures tending to disrupt the seal.

The material of which the rings are formed may be any suitable plastic such as vinyl plastics or the like. The sealing rings may be produced in any convenient manner but it is preferred to produce them by molding.

In use, the spaces between the rings are normally packed with transmission grease or heavy oil in a manner to completely fill the spaces between the seals. This transmission grease or oil is effective to prevent flow in the direction for which the rings are designed (with respect to the direction of inclination of the flexible portions thereof) and also prevents counter-flow either of oil out of the journal or of foreign material into the journal.

In use, the assembly of rings is relatively tightly compressed so that the thicker edge portions of the ring are pressed firmly into assembly. This pressure is of course accomplished through the medium of the annular members 18 and the split holding rings 20. In the case of the construction illustrated in Figure 4, it will be observed that the innermost outer ring 72 is in contact with a shoulder on the shaft 64, and the outer surface of the outer ring 72 is in contact with the annular member 18, which in this instance will rotate with the shaft. Accordingly, the sealing rings and the annular member 18 rotate with the shaft in Figure 4. On the other hand, in the construction illustrated in Figure 1, the thicker edge portions of the sealing rings are compressed together and are caused to bear against the inner surface of the journal and in this case the bearing structure 16 and the annular member 18 are stationary so that the rings are stationary and the shaft 12 rotates with respect thereto.

The drawings and the foregoing specification constitute a description of the improved shaft or journal seal in such full, clear, concise and exact terms as to enable any person skilled in the art to practice the invention, the scope of which is indicated by the appended claims.

What I claim as my invention is:

1. Sealing means for interposition between relatively rotatable shaft and journal parts comprising a plurality of flexible plastic intermediate rings having radially outer edge portions engageable with the radially inner surface of said journal part and having radially inner edge portions engageable with the radially outer surface of said shaft part, means fixing said rings to one of said parts for relative rotation with respect to the other of said parts, said rings each having at one side thereof and spaced radially a substantial distance from both the inner and outer edge portions thereof an annular rib extending axially of said ring, said rib being located more closely adjacent to said one part than to said other part, said rings being provided with interfitting annular tongue and groove formations at opposite sides thereof located in the circumferential zone of said ribs and effective to prevent relative radial displacement of the ribs in both radially inward and outward directions, the portions of said rings intermediate said ribs and said one part being relatively thick but spaced apart axially, the portions of said rings intermediate said ribs and said other part being relatively thin, spaced apart axially and inclined at an acute angle from a radial plane so as to yield under axial pressure in one direction to provide a more effective seal, the means fixing said rings to said one part comprising rigid means pressing said rings together axially in the zone of said ribs.

2. A shaft seal for fixed mounting in a journal for contact with a rotary shaft therein, said seal comprising an assembly of intermediate rings formed of flexible plastic material each of which has an annular thickened assembly rib spaced substantially from both its radially outer edge and its radially inner edge but more closely adjacent to its radially outer edge, portions of said rings intermediate said ribs and said radially outer edges being relatively thick but spaced apart axially, the portions of said rings intermediate said ribs and said radially inner edges being relatively thin and inclined at an acute angle from a radial plane, the radially inner edge portions of said rings terminating in inner edge surfaces inclined to the axes of said ribs and intersecting a side surface thereof at an acute angle, said rings having interfitting annular tongue and groove formations located in the circumferential zone of said ribs effective to prevent relative radial displacement of said ribs in both radially inward and outward directions, and means pressing said rings together axially in the zone of said ribs.

3. A shaft seal as defined in claim 2 in which the radially inner edge surfaces of said rings are concave.

4. A shaft seal for fixed mounting on a shaft for contact with the inner surface of a journal comprising an assembly of intermediate rings formed of flexible plastic material each of which has an annular thickened assembly rib spaced substantially from both its radially outer edge and its radially inner edge but more closely adjacent to its radially inner edge, the portions of said rings intermediate said ribs and the radially inner edge portions thereof being relatively thick but spaced apart axially, the portions of said rings intermediate said ribs and the radially outer edge portions thereof being relatively thin and inclined at an acute angle from radial planes, the radially outer edge portions of said rings terminating in edge surfaces inclined to the axis thereof and intersecting the adjacent side surfaces thereof at an acute angle, said rings having interfitting annular tongue and groove formations located in the circumferential zone of said ribs effective to prevent relative radial displacement of said ribs in both radially inward and outward directions, and means pressing said rings together axially in the zone of said ribs.

5. A shaft seal as defined in claim 4 in which the radially outer edge surfaces of said rings are concave.

References Cited in the file of this patent

UNITED STATES PATENTS

| | | |
|---|---|---|
| 1,992,967 | Roy | Mar. 5, 1935 |
| 2,264,147 | Dunlevy | Nov. 25, 1941 |
| 2,336,250 | Hein | Dec. 7, 1943 |
| 2,415,888 | Joy | Feb. 18, 1947 |
| 2,417,107 | Gregoire | Mar. 11, 1947 |
| 2,476,324 | Reich | July 19, 1949 |
| 2,596,174 | Reich | May 13, 1952 |

FOREIGN PATENTS

| | | |
|---|---|---|
| 545,556 | Great Britain | June 2, 1942 |
| 1,000,069 | France | Feb. 7, 1952 |